United States Patent [19]

Hussain

[11] Patent Number: 4,955,052
[45] Date of Patent: Sep. 4, 1990

[54] PAY PHONE SYSTEM AND APPARATUS
[76] Inventor: Syed Hussain, 1920 Shipway Ave., Long Beach, Calif. 90815
[21] Appl. No.: 385,407
[22] Filed: Jul. 27, 1989
[51] Int. Cl.⁵ .................... H04M 17/02; H04M 11/00
[52] U.S. Cl. ...................................... 379/94; 379/106; 379/145; 379/147; 379/148
[58] Field of Search ............... 379/143, 145, 147, 148, 379/106, 155

[56] References Cited

U.S. PATENT DOCUMENTS 4,124,775 11/1978 Zarouni ............................. 379/147
4,736,444 4/1988 Dhein ................................ 379/147

Primary Examiner—Stafford D. Schreyer
Attorney, Agent, or Firm—Georges A. Maxwell

[57] ABSTRACT

The pay phone apparatus of this invention includes a multiplicity of pay phones; a central switching board including a central switching device for each pay phone; and, a pair of telephone lines connecting each pay phone and its related switching device. Each pay phone has a coin mechanism to receive and hold nickels, dimes, and quarters deposited therein. The mechanism sends nickel, dime, and quarter coin signals to its related switching device each time a nickel, dime or quarter is deposited therein and operates to return coins held thereby to the user of the pay phone or to deliver them into a coin box in the pay phone in response to coin return and coin accept signals directed to it from the switching device. The invention next includes a counting device in each pay phone that receives coin signals from the mechanism, converts those signals into digital data, and stores in its memory the data relating to each denomination of coins deposited in and held by mechanism, the number of those coins last delivered by the mechanism into the coin box, and the total number of those coins that have been deposited in and accepted by the pay phone. The invention next includes a single monitoring station including a computer with a printer and connected with a related switching device on the central switching board. The computer is programmed to automatically sequentially call, connect, and disconnect with each pay phone.

9 Claims, 3 Drawing Sheets

PAY PHONE SYSTEM AND APPARATUS

BACKGROUND OF THE INVENTION

In the art of telecommunications, the great majority of telephone companies are equipped with, operate and maintain coin-operated pay phone systems that include central switching stations or boards and a multiplicity of coin-operated pay phone units strategically located throughout assigned service areas and that are connected with the central switching boards by pairs of telephone lines.

Pay phone systems distinguish from ordinary or common telephone systems in that the pay phone units thereof are equipped with coin mechanisms to receive, handle and retain or return coinage that is deposited therein by the users thereof.

In the great majority of pay phone systems, operation of those systems, including management of the coinage that is handled by the pay phone units is affected by a multiplicity of special electric operating signals and/or currents that are conducted between the pay phone units and their related central switching boards. Though the pay phone units are equipped with coin mechanisms into which users deposit coins to attain desired usage of those units, the coin mechanisms do not alone control use of the pay phone units but are, themselves, monitored and their operation is controlled by special switching devices and operators at the central switching boards that receive special signals generated by pay phone units and that direct necessary operating signals back to those units.

The majority of pay phone systems are separate from their telephone company's regular telephone systems that include private telephone units, and connection with and between those systems is made through and by the same or a similar interconnection and/or networking that is utilized to connect the central switching boards of different telephone systems that service different service areas.

While pay phone systems of the general character referred to above have long been in use and have provided excellent service to the public, they have proven to be notably less than satisfactory as regards the telephone company's ability to effectively manage them. The principal shortcoming found to exist in most of today's pay phone systems resides in the fact that the pay phone units include no suitable and effective means by which usage of those units and the coinage that is collected thereby is recorded or otherwise made readily available. As a result of the foregoing, it is extremely easy for those telephone employees whose job it is to service and collect the coins deposited in pay phone units to regularly and systematically steal a portion of the coinage they are engaged to collect in behalf of their employers. Such stealing of coinage by those employees, hereinafter called Collectors, will hereinafter be referred to as "Skimming."

In the case of many telephone companies, skimming by collectors has become so much of a problem that informal company policies have been established as to how much coinage collectors might safely skim for themselves each day.

In connection with the above, substantially standardized, difficult or impossible to contradict false excuses are used by collectors to explain away apparent shortages of coinage.

While ongoing records of pay phone calls are often made at the central switching boards of pay phone systems, for use by the central offices of the telephone companies to determine how much coinage should be collected from the pay phone units, those records are ineffective to determine how much coinage might have been stolen by vandals; by thieves with skeleton or pay keys to the coin boxes of the pay phone units; how much coinage the pay phone units might have been "shorted" by the use of various illicit tone generating or cheating devices; by malfunctioning of the systems; or, by collector skimming.

In one notable effort to eliminate skimming, most pay phone units now include coin box compartments or vaults with key-lock access doors and in which sealed coin boxes, in which coinage is deposited, are removably engaged. Where such structures are provided, the job of collectors, when servicing each pay phone, is to remove the previously installed sealed coin box from the coin box compartment or vault and to reinstall a newly sealed, empty, coin box in its place. The removed, sealed coin box is delivered by the collector to a coin counting office or station where its seal is broken and its contents counted under well supervised conditions. The provision and use of such coin boxes has proven to be little more than a minor inconvenience to those who are intent upon skimming. For example, the use of such coin boxes is rendered ineffective by collectors who purposefully fail to leave coin boxes in the pay phone units they service for short periods of time and collect and pocket that coinage that is loosely collected in the coin box compartments of the pay phone units upon delayed reinstallation of coin boxes therein. Following such a procedure, an unscrupulous collector can, during his lunch hour, skim off well over $100 from as few as ten closely related, frequently used pay phones without detection or proof of any wrongdoing.

The accumulated economic losses experienced by telephone companies as a result of skimming practiced by their employed collectors is a primary cause for the ever increasing cost for pay phone service exacted from the public.

As a result of the foregoing, in the recent past, what are referred to as "Smart" pay phones have been introduced and put into use in various pay phone systems. Smart pay phones are extremely costly and complicated computerized units that require costly modification of the central switching boards with which they are related. Smart pay phone units perform a multiplicity of functions that are not performed by regular pay phone units (now sometimes called "Dumb" units), including the monitoring, counting and recording of all cash transactions handled by each unit.

While smart pay phones provide many advantages not provided by "dumb" or common pay phone units, their adoption and use presents many serious problems. First, smart pay phone units manufactured in accordance with today's standards are not as strong, durable and trouble-free as are old or dumb pay phone units. Second, smart pay phone units are many times more costly to make or purchase, install and maintain than are standard pay phone units. Third, the special skills that are required to install, maintain and service smart pay phone units are not compatible with the skills required and exercised by those who are now qualified to install, maintain and service standard pay phone units. Fourth, smart pay phone units are, in fact, more complicated to use than are standard pay phone units and, as a result, are less user friendly than are standard pay phone units; that, as a result of long usage and familiarity, are user friendly. Fifth, with few exceptions, the initial capital investment or cost of the great majority of standard pay phone systems in use today have been paid for and the potential useful life expectancy thereof can be extended for a great many years. Accordingly, abandonment by telephone companies, of standard, paid-for, common pay phone systems and the adoption and use of more costly, yet to be paid for, smart pay phone systems cannot be economically justified.

It has been determined that the above referred to smart pay phone units and/or systems offer and do much more than is needed or desired by the telephone companies and by the public. Much of that which distinguishes smart pay phone units from common pay phone units is often said to be merely "gimmicky" or cosmetic in nature.

The single and most desired function offered by the new, fully computerized smart pay phone units resides in the fact that they accurately count and make available a record of all coinage deposited in and collected by those units and are therefore such that those substantial economic losses that are now experienced as a result of skimming and the like can be eliminated or notably reduced. No other feature offered by the new smart pay phone units is of such economic importance as to merit serious consideration.

OBJECTS AND FEATURES OF THE INVENTION

It is an object of this invention to enhance existing pay phone systems with novel means to accurately count, record and monitor the coinage deposited in and accepted by each of a multiplicity pay phone units in the system.

It is an object and a feature of the invention to provide each pay phone unit in an existing and operating pay phone system with a counting device or circuit board that operates to count and record, as stored data, in a microcomputer part thereof, the number of different denominations of coins deposited in and accepted by each pay phone unit and a single monitoring unit connected in and with the pay phone system that operates to intermittently connect with the circuit board in each pay phone unit and to read, display and print out that data that is recorded therein for subsequent study and analysis.

Yet another object and feature of the invention is to provide an improved system and means or apparatus of the general character referred to above wherein the counting device or circuit boards in the pay phone units are tapped into the existing circuitry of the pay phone units to receive selected operating signals of the pay phone system that are accessible within the pay phone units and record those signals as retained or memorized data, without in any way altering or otherwise interfering with the established operation of the pay phone units and/or their related pay phone systems.

It is another object and feature of the invention to provide an improved system and apparatus of the general character referred to in the foregoing wherein the monitoring unit is a computer, such as a common personal computer, connected in and with the central switching board of its related pay phone system. The monitoring unit or computer is programmed to automatically dial and connect with each pay phone unit, access and read the data stored therein and that has a peripheral printer connected to it that prints the data received and processed by it. Accordingly, the monitoring unit is simply connected in and with the pay phone system like a common telephone unit is and in no way alters or otherwise interferes with the regular, established operation of the pay phone system. The counting device monitoring units and the pay phone system with which they are related are mutually passive.

It is yet another object and feature of the invention to provide the counting devices or circuit boards in the pay phone units with one or more sensing devices that are responsive to physical changes or abnormalities in the pay phone units and that send special signals to their related circuit boards to be stored in the memory thereof as retrievable and usable data.

It is an object and a feature of the invention to provide counting devices or circuit boards for pay phone units of the general character referred to above that are: easy and economical to make; sufficiently small, rugged and durable that they can be easily and conveniently accommodated in void spaces found in all known standard pay phone units; and, that are such that they can be easily and quickly installed in and with related pay phone units without the exercise of any skills that those who service pay phone units are not possessed of.

Finally, it is an object and a feature of the invention to provide a manually operable programmer unit that is operable to put into the memory of each counting device desired retrievable data and that is operable to read all retrievable data in each counting device at the sites of those devices, independent of the monitoring station.

The foregoing and other objects and features of the invention will be apparent and will be made fully understood by the following detailed description of one preferred form and embodiment of the invention throughout which description references made to the accompanying drawings.

DETAILED DESCRIPTION OF THE INVENTION

Figure 1:
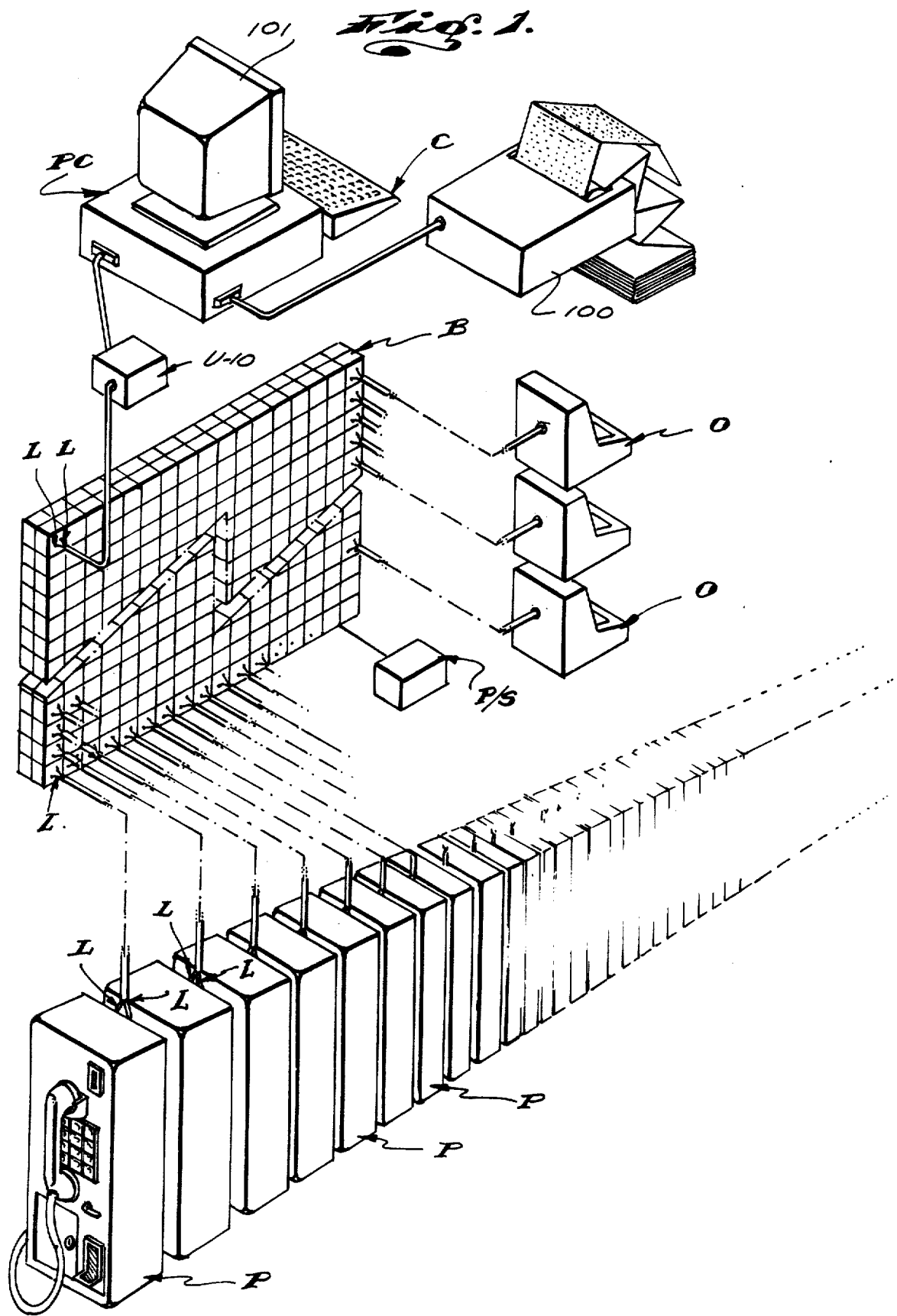
FIG. 1 is a diagrammatic view of a pay phone system which the invention is related.

Referring to the drawings; FIG. 1 is a diagrammatic view of a typical pay phone system A. The system A includes a switching station or central switching board B and a multiplicity of pay phone units P connected with the board B by pairs of telephone lines L. In addition to the foregoing, the system A includes a power supply P/S and a plurality of telephone operator stations O connected with the board B. The board B is an electrical grid or network that includes a central programmed switching device (not shown) for each pay phone unit P. The programmed switching devices are such that they operate in response to and work to conduct the several operating signals utilized in the operation and management of the pay phone system A. Basically, the system A operates to connect each pay phone unit P from which calls are initiated to other pay phone units P of the system A or to any other telephone unit (not shown) that is a part of a network of telephone systems of which the system A is a part, in accordance with old and well established practices that are familiar to all of those who are familiar with the art of telecommunications.

While each telephone system of a network of such systems is made to be operationally compatible with each of the other systems of the network, so that effective interconnection can be established therebetween, there can and often does exist notable distinctions in the hardware and modes of operation of those systems. For example, the degree to which different systems are automated and the automating equipment (switches and the like), of different systems is subject to notable differences. Further, for example, some systems are equipped with rotary dialing devices that utilize and operate in response to electrical pulse signals and are called "pulse systems." Other systems are equipped with push button dialing devices that utilize and operate in response to distinct electrical signals that differ in frequency and that are called "tone systems." Yet other systems are, in effect, a combination of the two above noted systems and are made to operate effectively in response to both pulse and tone signals.

It is also to be noted that throughout the telephone industry many telephone companies adopt and utilize pulse and/or tone signals that are distinct from the pulse and/or tone signals that other companies utilize so that access into their systems can be better controlled and for various other practical purposes.

The foregoing is important to note and to understand since it has great effect on that which can and cannot be accomplished to alter or effect the operation and management of telephone systems and greatly affects the physical nature and/or make-up of any new equipment and means that might be effectively utilized in and throughout those telephone systems and/or networks that are now in use.

Figure 2:
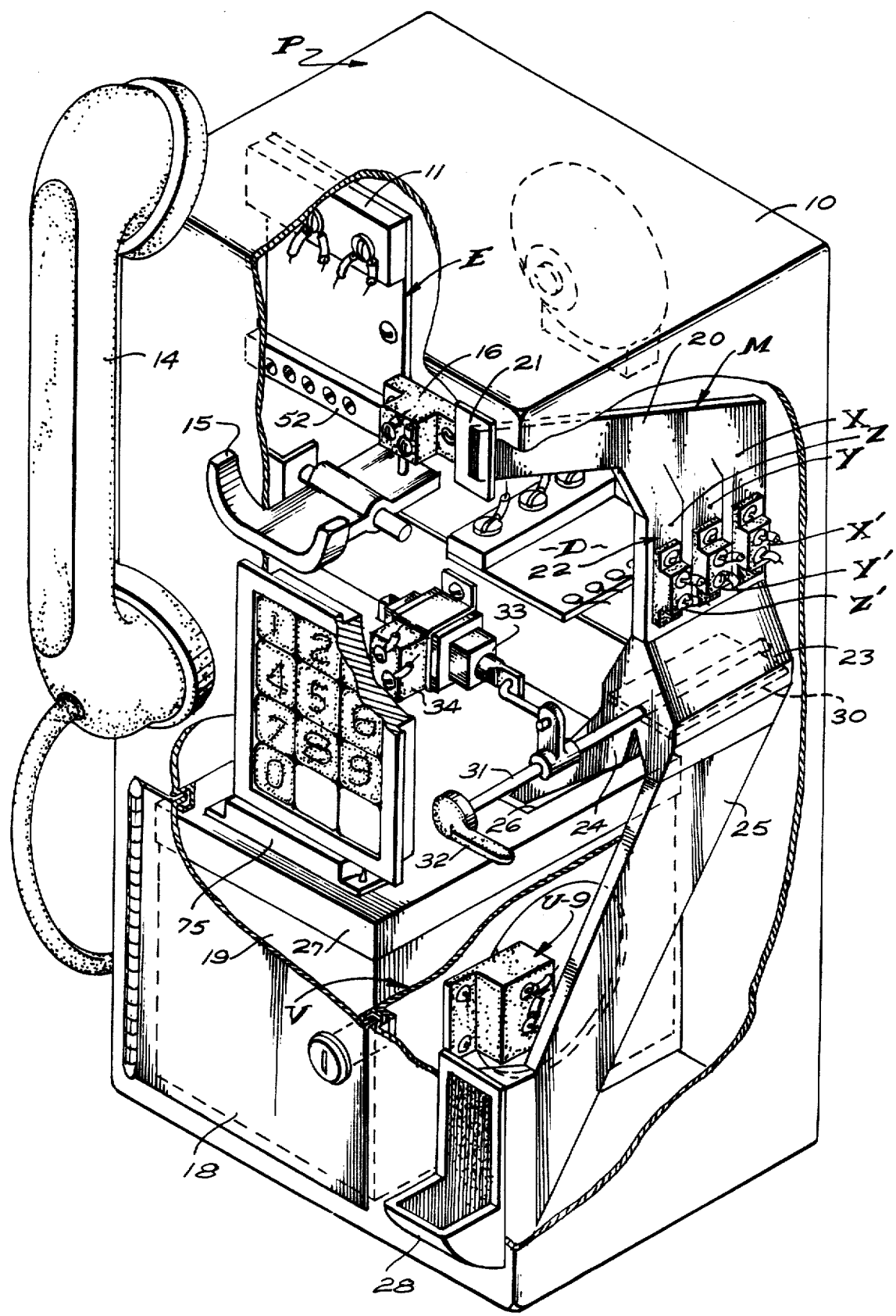
FIG. 2 is an isometric schematic view of a typical pay phone unit.

FIG. 2 of the drawings is an isometric schematic view of a fanciful though typical pay phone unit P. The unit P includes a metal, box-like housing 10. The housing 10 accommodates a circuit board of electrical chassis E with terminal block 11 that connects with the pair of telephone lines L for the unit P and with each of the other electrical components and devices of the pay phone unit; such as a dialing device 12 that is accessible at the exterior of the housing 10; a manually engagable hand instrument 14 that includes microphone and speaker devices (not shown); a pivotally mounted instrument cradle 15 in which the hand instrument 14 is normally removably engaged and that operates to close a normally open on-off hook switch 16; and, a coin mechanism M. The unit P further includes coin handling and collecting means related to the coin mechanism M and that includes a coin box compartment or vault V with a key locked closure or vault door 18 and a coin box 19 that is removably engaged in the vault V. The coin mechanism M is positioned in the housing 10 above the noted coin handling and collecting means and has a coin inlet chute 20 communicating with a coin inlet slot 21 in the housing. In the case shown, the mechanism M includes coin classifying and counting means 22 beneath the inlet chute 20 and through which coins are transported. A coin hopper 23 coin accept and return chutes 24 and 25 occurs below the means 22. The accept chute 24 extends down to the vault V and communicates with a coin inlet slot 26 in a top wall or cover 27 of the coin box 19. The return chute 25 extends to and opens at a coin-return tray 28 accessible at the exterior of the housing 10.

The classifying and counting means 22 first operates to identify and separate each domination of coins the unit P is made to handle and accept. In the form of the invention under consideration, the unit P is made to accept nickels, dimes and quarters and the means 22 is shown as including nickel, dime and quarter troughs or X, Y and Z into and through which nickels, dimes and quarters are directed and made to move as a result of physical differences. The means 22, as shown, next operates to generate distinct nickel, dime and quarter signals each time a nickel, dime or quarter is moved therethrough. In most instances, the noted nickel, dime and quarter coin signals are generated and/or transmitted by momentary closing of microswitches. In the case illustrated, nickel, dime and quarter microswitches X', Y' and Z' are shown adjacent the troughs X, Y and Z. In practice, any one of numerous suitable actuating devices or mechanisms can be related to the noted troughs and microswitches to effect actuation or closing of the switches each time a coin moves thereby.

In the case of pulse signal telephone systems, the coin signals for nickels, dimes and quarters might, for example, be three, four and five pulse signals while in the case of tone signal phone systems, those signals might be equally distinct frequency signals. In either case, the coin signals are conducted from the pay phone units P to their related central switching devices at the central switching board B of the system A where they initiate a processed operation or function of the switching device.

The coins conducted through the means 22 dump into the hopper 23 where they are temporarily collected and held for subsequent delivery into the coin box 19 or into the coin-return tray 20 of the unit P.

The hopper 23 is shown as having a pivotally mounted trap door 30 upon which coins moved through the means 22 collect. The trap door is selectively pivoted or tipped to spill the coins collected thereon into the accept and return chutes. The trap door is shown pivotally carried by a central support shaft 31.

A manually operable coin-return lever 32 is operatively related to the trap door and is such that the user can cause the coins he or she has deposited in the pay phone unit to be returned, via the coin-return tray, prior to the coins having been accepted by the unit and deposited in the coin box.

The trap door of the hopper structure is normally operated by an electric signal actuated operating device that is shown as comprising a two-way solenoid 33 under control of a relay 34 to which coin-return and coin-accept signals, directed into the pay phone unit P from its related central switching device at the switching board B are directed. The solenoid is shown connected with a lever arm on the support shaft 31.

In the operation and use of the pay phone system, the user of the pay phone unit P first engages and lifts the hand instrument 14 from its cradle 15, causing the on-off hook switch 16 to close, thereby closing the loop circuit between the unit P, through its related pair of telephone lines L, and its related central switching device at the central switching board B. The central switching device is programmed or functions to receive and count coin signals for a minimum charge, such as 25¢, before proceeding with processing the call to be made. The user deposits 25¢ (a quarter; two dimes and a nickel; a dime and three nickels; or five nickels) in the unit P, and the unit P conducts a corresponding coin signal or signals to the central switching device. The switching device then automatically closes the above noted loop circuit and sends a dial tone to the unit P, whereupon the user dials for operator assistance if making a non-local multiunit call or dials the telephone number of another telephone unit if the call to be made is a local or a one-unit call (a non-timed, minimum charge call that does not require operator assistance). If a local call is being made, the central switching device operates to recognize it as such a call and to automatically direct the dialed telephone number, which is the access signal of the central switching device for the telephone the user seeks to connect with. When the central switching device of the other telephone unit receives its access signal, it first sends a bell tone signal back to the pay phone unit P and sends an intermittent ring signal over one of (the hot) telephone lines for that telephone energizing a bell that summons a person to that phone. When that person lifts the hand instrument of the second telephone unit from its cradle, the on-off hook switch of that unit closes, closing the loop circuit therefore, causing the bell tone and ring signals to terminate and establishing that full connection between the two telephone units that allows for voice communication. When full connection is thus established, the central switching device of the pay phone unit P transmits a coin-accept signal to the unit P causing the hopper 23 to dump or cause the coins therein to drop or move into the coin box 19.

If the phone number called is not a local call or if the user dials for operator assistance, the central switching device for that unit automatically connects the unit with an operator station O and an operator assume full management and operation of the system. As a general rule, the operator determines and advises the user of the pay phone what the charges will be for the call the user desires to make, sends a coin-return signal to the unit to cause the coin or coins first deposited therein to be returned to the user and then suitably monitors the number and/or amount of coins next deposited by the user. When the required coinage is deposited, the operator might let the user dial the number being called or might himself or herself dial that number and complete the call.

It is to be noted that when the loop circuit for unit P is open, the trap door of the hopper assumes a position to return coins to the coin-return tray and only assumes its normal operating position when the loop circuit is closed. Thus, coins prematurely deposited in the unit P are immediately returned to the user, via the return tray prior to that time when the loop circuit is closed.

Many pay phone units have more complex coin mechanisms with change-making capabilities and are such that an operator can, by directing certain signals to the pay phone units cause those units to deposit in their coin-return trays one or more nickels, dimes or quarters as might be required. Such capabilities are only accessible to an controlled by the operators and can only be operated to return coins that have not yet been deposited in the coin boxes of the pay phone units. Further, when change is thus made and coins are returned, the signals used to effect their return are, as a rule, directed to coin metering means that are often provided at the central switching board and operate to subtract that coinage which has been returned from the count of the coinage previously deposited and that is held in the buffer.

After a user of the pay phone unit P has deposited coins in the unit P and the call sought to be made is, for any reason, not completed and the user hangs up the hand instrument, opening the switch 16 and the loop circuit, a coin-return signal is generated and conducted by the switching device to the unit P and the hopper is actuated to dump the coins then in the hopper to the coin-return tray of the unit P.

The system and apparatus of the present invention includes and utilizes the pay phone system illustrated and described above and, in addition thereto, includes a novel counting device or circuit board D for each pay phone unit P. The counting device or circuit board D functions to keep an ongoing accurate count of coinage (nickels, dimes and quarters) deposited in the hopper of the unit P, to accurately hold in memory the number of each of those coins last deposited in the coin box of the unit P and the total number of each of those coins that have been deposited in the unit P. The circuit board D also functions to allow for access to the data stored therein and to transmit a carrier voltage that carries the data stored therein into the pay phone system, upon demand.

The invention further includes a single monitoring station C located at or remote from and suitably connected with a related central switching device at the central switching board B of the pay phone system and that functions to automatically intermittently establish full communicating connection with the circuit board D of each pay phone unit P. When connected with a unit P, the monitoring station C operates to read, process and print out the data in the memory in the circuit board of that unit P.

The counting device or circuit board D for each pay phone unit P is sufficiently small and compact so that it can be easily and conveniently mounted for easy and convenient access in one of the several voids or spaces that are to be found within the housings of the great majority of ordinary pay phone units.

Figure 3:
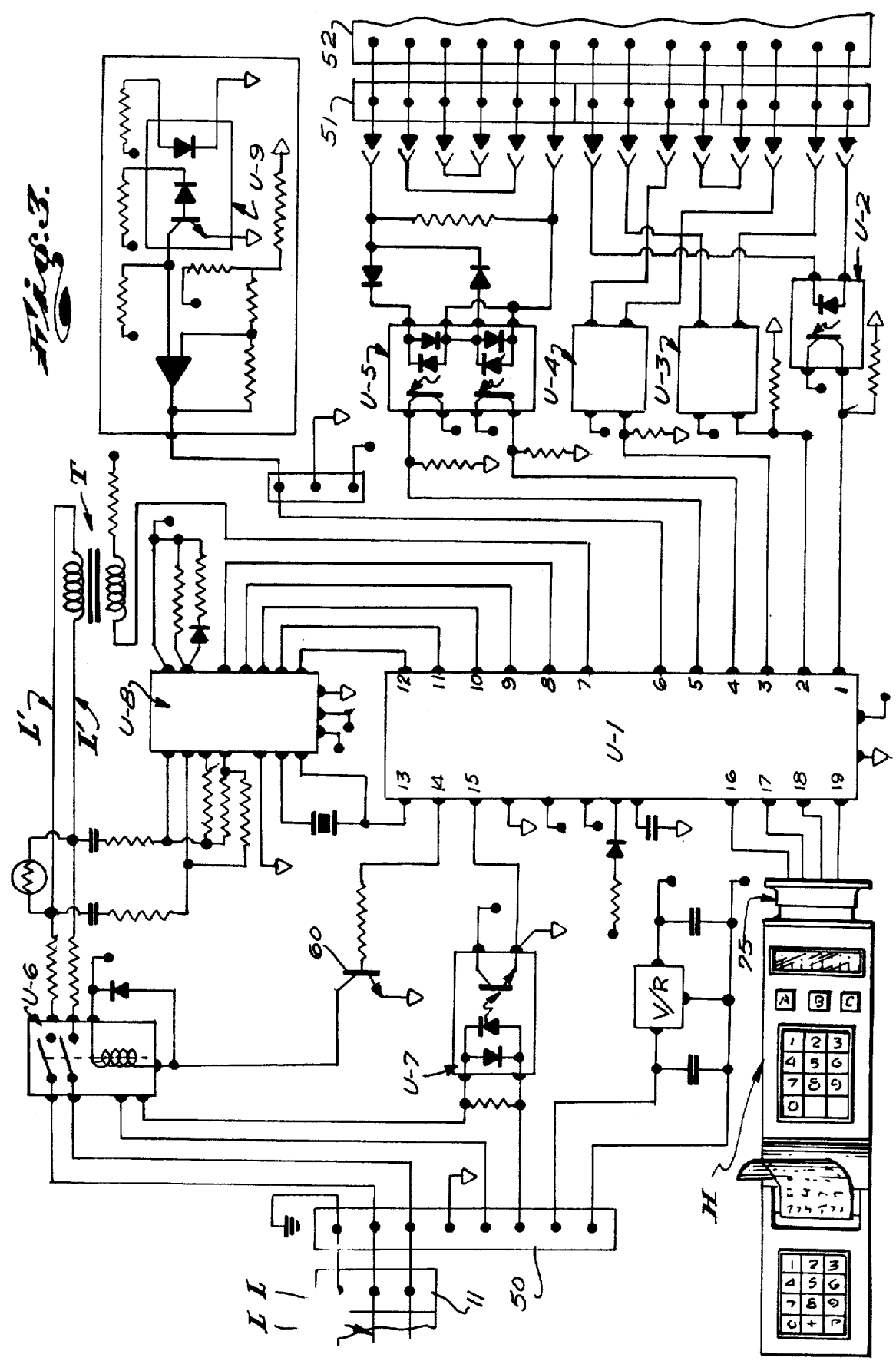
FIG. 3 is a diagrammatic view of the circuit of the new pay phone unit meter.

Referring to FIG. 3 of the drawings, for the purpose of this disclosure, the circuit board D for each pay phone unit P has a terminal block 50 with terminals suitably connected with the terminals for the pair of telephone lines L and with a ground terminal on the terminal block 11 on the electrical circuit board or chassis E in the pay phone unit P and is shown as having a multi-pin (14-pin) connector part 51, the pins of which connected with related pins of a mating connector part that is connected with terminals of a secondary terminal block 52 on the electrical chassis E, to or through which the several different electrical signals for the system are conducted.

The standard operating electrical power for pay phone systems is and will be described as 48 volts. The operating voltage for the circuit board D is 5 volts. Accordingly, the circuit board D includes a suitable voltage regulator V/R connected with the terminal block 50 and that operates to supply the circuit board D with its required 5-volt power.

The principal part or component of the circuit board D is a single chip microcomputer U-1. For the purposes of this disclosure, U-1 is shown as having 16 numbered channel pins. U-1 is designed and produced so that it normally operates in response to and to receive, process and store in its memory digital data corresponding to certain signals directed into the circuit board D from the pay phone system. U-1 is programmable and is programmed to effect access to data stored therein and to transmit that data on a data carrying voltage for introduction into the system A and for transmission of the data to the monitoring station C, in response to predetermined command signals.

The pins 1, 2 and 3 of U-1 are connected with related nickel, dime and quarter coin signal terminals at the terminal block 52 through and by means of optoelectric couplers U-2, U-3 and U-4. The couplers U-2, U-31 and U-4 receive the distinct 48-volt coin signals generated by the coin mechanism M of unit P and deliver corresponding 5-volt digital coin signals to the Pins 1, 2 and 3 of U-1.

For the purpose of this disclosure, U-1 will be described as having three distinct memory buffers or registers related to each pin 1, 2 and 3. The pins 1, 2 and 3 receive the nickel, dime and quarter digital coin signals from U-2, U-3 and U-4. The registers for each denomination of coins includes a first register that receives its related coin signals and temporarily stores in its memory the number of coins that are conducted through the mechanism M and held in the hopper 23 subsequent to each operation of the hopper that causes the hopper to dump coins and empty itself, that is, subsequent to the conducting of the 48-volt coin-accept or coin-return signals directed from the central switching device to the mechanism M and the conducting of corresponding of 5-volt digital signals to U-1. The registers for each denomination of coins next includes a second register to which the count of coins in its related first register is advanced or moved when a coin-accept signal is conducted to the unit P to effect dumping the coins then in the hopper into the coin box and a corresponding digital coin-accept signal is directed to U-1. Each time the count of coins in the first registers are moved to their related second registers, the first registers are zeroed out or nulled. Finally, the registers for each denomination of coins includes a third register in which the total count of coins deposited in the pay phone unit P is permanently held in memory and to which the count of coins in its related second register is added each time the coin-accept signals are directed through the system or apparatus, as noted above.

In furtherance of the above, pins 4 and 5 of U-1 receive coin-accept and coin-return signals. The pins 4 and 5 are connected with a suitable optoelectric coupler U-5 that is, in turn, connected with those terminals of the terminal block 52 to and or through which the 48-volt coin-accept and coin-return signals are conducted.

It is to be noted that in the event the circuit board D is related to a pay phone unit in which the coin mechanism has change-making capabilities, the circuit board is provided with means (similar to the above-noted coin signal handling means) to receive the special coin-return signals that are utilitized to effect "making change" and the microcomputer U-1 is programmed to receive those special signals and to subtract from the count of coins in its first register for each denomination of coins the number of those coins that have been returned to the user as "change" is being made.

In accordance with the foregoing, at any point of time, the microcomputer U-1 has in its memory the number of each denomination of coins then in the hopper 23, the number of each denomination of coins that was last transferred from the hopper to the coin box 19; and, the total number of each denomination of coins that has been accepted by pay phone unit.

It will be noted that the counting of coins and the placing of related data in memory in U-1, as noted above, only takes place when the loop circuit through and between the telephone lines L, the pay phone unit P and its related central switching device, is closed by closing of the normally open on-off hook switch 16 in the pay phone unit. It will be further apparent that unless the noted loop circuit is closed, by the act of a user of the pay phone unhooking the hand instrument 14 thereof and thereby causing the switch 16 to close, the pay phone unit is not fully operational and connection between the pay phone unit P and the monitoring station C, enabling the monitoring station to access and retrieve data stored in the memory of the microcomputer U-1 in the unit P cannot be made.

In accordance with the above and to enable the monitoring station C to effect closing the loop circuit for the pay phone unit P and thereby establish necessary connection therewith the circuit board D includes what can be called a loop circuit branch or tap. The loop circuit branch or tap includes a pair of telephone line extension lines L' connected with the telephone line terminals of the terminal block 50. In the case illustrated, the pair of lines L' extend to and are connected with the opposite ends of a secondary winding of a step-up transformer T (the function of which will be later described). Each line L' has one of a pair of normally open switches of a compound relay switch U-6 engaged therein, between the terminal block 50 and the transformer T. The relay switch is operated to close the switches thereof and to thereby close the loop circuit tap established by the pairs of lines L and L' and the transformer T by an operating voltage conducted through the pin 14 of the microcomputer U-1 through a voltage amplifier 60.

The circuit board next includes a photoelectric coupler U-7 connected with the between pin 15 of U-1 and the terminal of the terminal block 50 that connects with that telephone line L through which the 48-volt ring signal from the central switching device for the pay phone unit is conducted when connection with the pay phone unit, by another telephone unit is sought to be established. The ring signal is an intermittent voltage that normally intermittently rings a bell or equivalent sound emitter in the pay phone unit P. The coupler U-7 converts the intermittent ring signals to intermittent 5-volt pulses that are directed to pin 15 of U-1. U-1 is programmed so that upon receiving a predetermined or set number of pulses at pin 15, it sends an operating voltage for actuating and closing the relay U-6 from pin 14 through the amplifier 60 and to the coil of U-6, thereby closing the relay and the loop circuit. Thus, necessary closing of the loop circuit for the unit P is established though the hook switch 16 remains open.

In furtherance of my invention, the circuit board D next includes dial-tone multi-frequency processor U-8 with a first pair of pins, each of which is connected with one of the lines L' between the relay U-6 and the transformer T. U-8 is shown as having five additional pins, each of which is connected with a related pin (pins 8 through 12) of U-1. U-8 picks up and/or reads the several distinct command signals generated by the monitoring station C and imposed upon the operating voltage of the system A and directed through the loop circuit of the unit P. U-8 processes the command signals received from the loop circuit and delivers corresponding 5-volt digital signals to U-1.

Each of the several command signals processed and emitted by U-8 instruct and/or cause the microcomputer U-1 to perform functions it is programmed to perform when connection with and between unit P and the monitoring station C is established and the station C functions to read, process and print out the accessible data stored in U-1. For example, one command signal causes U-1 to transmit a 5-volt carrier voltage from its pin 5 to the primary coil of the transformer T and other signals instruct and/or cause U-1 to impose the data stored in certain or selected registers onto the signal carrying voltage.

The step-up transformer T steps up the 5-volt signal carrying voltage delivered by U-1 to 48 volts and imposes the stepped-up data carrying voltage onto the telephone system voltage (48 volts) for transmission to the monitoring means C.

With the structure set forth above, it will be apparent that when the pay phone unit P is not in use and the loop circuit is open by virtue of the fact that the on-off hook switch 16 thereof is left to remain open, the switch 16 is in effect bypassed and the loop circuit is closed by the circuit board D in response to a predetermined set number of ring signals (for example, 5 or 6 pulses) generated by the pay phone system and directed to the pay phone unit P when connection with the pay phone unit is first sought to be established by the monitoring station C, that is, when the monitoring station has dialed the dial number of the pay phone unit P and intermittent ring signals are directed through it.

In practice, for example, there is a first command signal that causes the microcomputer U-1 to commence to send and direct the data carrying voltage to the transformer T; another command signal causes U-1 to impose the data stored in its several above-noted second registers onto the carrier voltage; and, yet another command signal causes U-1 to impose the data stored in the several above-noted third registers onto the carrier signal.

In practice, it is necessary for effective and satisfactory operation and use of the invention that the microcomputer U-1 in each pay phone unit include a register or buffer in which the dial number of the pay phone unit is stored in memory and is made accessible to the monitoring station C so that when the station C reads, processes and prints out the data stored therein, the dialing number of that pay phone unit is included and made a part of that data. Thus, the processed and printed data of each pay phone unit is identified by that pay phone unit's dialing number.

In furtherance of my invention and to facilitate entering the dialing number of each pay phone unit into the memory of its microcomputer U-1, I provide a portable manually operable programmer H that releasably connects with pins 16, 17, 18 and 19 of U-1 by means of a 4-pin connector 75. The part of the connector 75 related to U-1 is preferably connected therewith by elongate flexible conductors so that it can be mounted within the housing 10 of its related pay phone unit P where it is easily accessible by a coin collector when the door 18 of the coin box vault thereof is opened. For the purpose of this disclosure, in FIG. 2 of the drawings, I have shown the circuit board related part of the connector 75 mounted in the housing 10 above the open top of the vault V, adjacent the open front thereof. That connector part is disposed downwardly so that its mating part, related to the programmer H, can be easily moved upwardly into engagement therewith when the vault door is open.

The programmer H is a microcomputer-based device that is functionally compatible with the circuit boards D that I provide and has its own memory, input and output. The programmer H includes an LCD read-out device; a ten-digit keyboard; and, preferably includes a limited number of special function keys to facilitate the performance of those functions it is intended to perform.

The structure, circuitry and functional characteristics of the programmer H are dictated by the structure and functional characteristics of the circuit boards D but, in practice, can be established in many different and distinct forms. Accordingly, illustration and/or detailed description of any one and particular embodiment of programmer H would serve little purpose and will not be undertaken. It will suffice to note that the programmer is compatible with the circuit boards D and to note those primary functions it is intended to perform.

The programmer H is a multi-purpose device. The first and primary function of the programmer is to put into the memory of the microcomputer's U-1 of each circuit board D that digital data that corresponds to the dialing number of the pay phone units P. This function is performed by first connecting the programmer H with the circuit board D of a pay phone being serviced, by means of the connector 75; pressing a function key or keys necessary to cause the programmer to perform that function and thereafter pressing or striking out the dialing number of the pay phone unit P on the key pad.

The monitoring station C, when connected with the circuit board D of each pay phone unit P operates to send a special command signal to the circuit board D that causes the microcomputer U-1 thereof to impose the dial number digital data stored therein on the carrier voltage directed thereby to the transformer T and for subsequent transmission through the system A to the monitoring station C.

In addition to programming the circuit board D as noted above, the programmer H is preferably operable, when connected with the circuit board D of each pay phone unit P to access the memory of the microcomputer U-1 thereof and to display in its LCD read-out device the several items of data stored therein. Such data might advantageously and preferably include the dialing number of the pay phone; the numbers of nickels, dimes and quarters recorded in the second and third registers of the microcomputer U-1 and other special data that might be placed and/or held in the memory of the microcomputer U-1.

The purpose of the foregoing is so that the duties of coin collectors hired to remove and collect coin boxes from the pay phone units includes reading the data stored in the circuit boards of those pay phone units, recording that data on slips of paper or receipts and attaching or inserting those receipts on or within the coin boxes. The providing of such receipts is highly desirable since it provides a permanent record of the numbers of coins in the coin boxes of the pay phone units serviced at the precise time that the coin boxes are removed from the pay phone units for collecting purposes.

In practice and in the reduction to practice of my invention, the task of the collectors to prepare the required receipts is facilitated by incorporating or attaching to each programmer H an ordinary or common portable printer-calculator that can be advantageously operated by the collector using it to produce an appropriate printed paper receipt that can be easily and conveniently attached to or deposited in the coin box of each pay phone unit P, as and when the coin box is removed therefrom.

In addition to counting and managing coinage handled by the coin mechanism, hopper, coin box and coin-return tray of the unit P, the invention can monitor and provide data relating to certain physical conditions in and about the pay phone unit P. In the preferred carrying out of the invention, the improvements include a sensing device U-9 related to the vault V of the pay phone unit P to sense the presence of the coin box therein. The device U-9, herein called a coin box detector, can very widely in form and construction and is shown as a unitary device that is suitably grounded and that is suitably connected with pin 7 of the microcomputer U-1. The device 7 is shown as including a light-emitting device and a related photo-sensitive conductor device. U-9 is positioned in the housing 10 of the unit P adjacent the coin box vault V and generates light that is directed onto and reflected by the surface of the coin box positioned within the vault. The photo-sensitive conductor device is positioned to receive light that is reflected by the coin box and functions to continuously direct a distinct coin box signal to U-1. That coin box signal is processed and transmitted by U-1 to the monitoring station C together with other data so transmitted by U-1. When the coin box is removed from the vault of a unit P, the device U-9 thereof ceases to conduct the coin box signal to U-1 and the absence of the coin box in the unit P is thereby effectively noted.

In addition to the coin box detector U-9, other sensing devices can be provided and employed in carrying out my invention. For example, other equivalent sensing devices including a simple switch suitably related to the vault door can be provided to detect when the vault door has been left unlocked and/or when that door has been forced open. Yet other similar sensing devices can, if desired, be added to sense other physical conditions in and about the pay phone unit P that the telephone company might wish to monitor.

The information or data afforded by the coin box detector and those other detectors that might be provided is received by the microcomputer U-1 and is made available to the monitoring station C thereby.

Referring to FIG. 1 of the drawings, the monitoring station C of the present invention includes a computer PC connected with a related central switching device at the central switching board B of the system A by means of and/or through a suitable modem U-10. The means C can and is shown as including a printer 100 connected with the computer PC and, if desired, can, as shown, include a monitor 101 connected with the computer.

In practice, it is preferred, though not necessary, that the monitoring station C be connected with a regular (non-pay phone) telephone system that is connected with the system A, in accordance with common practices, so that the computer PC need not be programmed to send those coin signals that it would otherwise have to sent in order to effect necessary functioning of the system A, to establish desired connection with the unit P. This practice also eliminates the possibility that operation and use of the station C might interfere with and complicate some preexisting coin metering and/or accounting means and procedure maintained for the system A at the central switching board and central offices of the telephone company.

The computer PC can and, for obvious economic reasons, is preferably one of the many inexpensive personal computers that are now commercially available. The computer is programmed to sequentially, automatically "dial" the telephone numbers of and to establish connection with each of the pay phone units P in the system A. The computer is programmed so that after connection is made with a pay phone unit P and the loop circuit of that unit is closed, as noted above, it sequentially transmits those command signals to the circuit board D and microcomputer U-1 to impose the desired data made available thereby on the carrier voltage emitted therefrom and to, by means of the transformer T, impose that data onto the 48-volt power of the system A. That data is conducted to, receive and processed by the computer PC and the processed data is printed out, in permanent usable form, by the printer 100. After the computer PC runs through and completes transmitting its several command signals and after it has received and processed the data requested, it is programmed to "hang up" or "disconnect" with that pay phone unit and to proceed to connect with the next-to-be-monitored pay phone unit. When the monitoring station "hangs up" or "disconnects" as noted above, the pay phone unit P with which it was last connected is left ready for regular ongoing use and service.

In the reduction to practice of my invention, the computer can dial, connect with, read, process and print out the data from a pay phone unit in about 10 seconds. Accordingly, the pay phone units can be monitored at a rate of about 60 units per minute; 360 units per hours and 16,400 units per day. Accordingly, in a pay phone system having less than 16,000 pay phone units, the invention can operate to monitor each pay phone unit at least once a day.

In practice, if desired, the monitoring station C can include more than one computer so that each pay phone unit or selected of pay phone units can be monitored two, three or more times a day, as desired or as circumstances require.

In practice, one computer PC can be provided to monitor all the pay phone units of its related pay phone system on a regular ongoing basis and one or more secondary computers can be provided to monitor certain of the pay phone units that have been identified as requiring more frequent monitoring than can be accomplished by the primary computer. Due to the rather low cost of the computers and the ease with which they can be programmed to monitor selected pay phone units in the system, the provision and availability of at least one secondary monitoring unit is anticipated wherever the present invention is put to use.

The counting devices or circuit boards D, monitoring station C and programmer H here provided, in combination with the basic pay phone system and apparatus with which they are related, establish a new and novel pay phone system wherein, in addition to performing all of the functions normally performed by the basic pay phone system, perform new and added functions that greatly enhance the management and use of the basic pay phone system. Those added and new functions include, but are not limited to, accurate identification of each pay phone unit monitored together with an accurate accounting of the total number of each denomination of coins deposited in and accepted by that pay phone unit; the number of each denomination of coins that was last added to that total number of coins; the absence or presence of a coin box in the coin box vault of that pay phone unit, and, all other data that might be made available. The foregoing data and information regarding each pay phone unit is stored within the unit itself for intermittent access and retrieval by the monitoring station C and by the programmer H. Accordingly, the subject data and information is not readily subject to and is highly unlikely to being compromised by conditions and events outside of or remote from the pay phone units.

The new pay phone system here provided next performs the new function of automatically, periodically reading, processing and making a permanent print-out of the above-noted new data and information collected and saved in and by each of the pay phone units by a single remote monitoring station that can be located at any location where it can be connected with a related central switching device of its related central switching board by a pair of telephone lines. In practice the monitoring station can, if desired, be located at the office of an independent service company hired by the telephone company to obtain and provide the company with the desired data.

The print-out produced by the monitoring station C can be studied and analyzed to detect anomalies in the coinage that the telephone company believes should have been collected (based upon other in-house record-keeping) and that which has been collected from each of the pay phone units. The computer PC of the monitoring station C if preferably programmed to search for and print out a record of all data previously received from each pay phone unit over protracted periods of time and from which a history of past collections and a projection of all future earnings likely to be made by each pay phone unit can be made. Such histories and projections enable the telephone companies to more effectively manage their pay phone systems.

Having described only one typical preferred form and embodiment of my invention, I do not wish to be limited to the specific details herein set forth but wish to reserve to myself any modifications and/or variations that might appear to those skilled in the art and which fall within the scope of the following claims.

Having described my invention, I claim:

1. A pay phone system and apparatus comprising a multiplicity of user-operated pay phones, a central switching board including a central switching device for each pay phone and an interconnecting electrical network, a pair of telephone lines connecting each pay phone with its related switching device and establishing a normally open loop circuit therebetween and a power supply connected with and conducting a primary operating voltage to the switching board; each pay phone includes a normally open hook-switch connected between the telephone lines and that is closed when a user engages a manually operable actuating part of the pay phone that serves to effect operation and use thereof; each pay phone has a distinct dialing number that when directed through said network from another telephone causes the switching device of the pay phone to direct an intermittent ring signal through one of its related telephone lines to the pay phone to energize a signal emitter to summon a user of the pay phone to engage said actuating part and close said loop circuit; each pay phone next includes a coin mechanism that upon closing of the loop circuit operates to receive and hold nickels, dimes and quarters deposited in the pay phone by the user and that sends nickel, dime and quarter coin signals to the switching device each time such a coin is deposited therein, the switching device operates to connect with said network and to send a dial tone signal to the pay phone and to enable it to be put to further intended use when the sum of coin signals directed to it equals a minimum call charge, the mechanism operates to selectively deliver coins held thereby into a coin-return tray or into a coin box in the pay phone in response to coin-return and coin-accept signals directed to it by the switching device; the system and apparatus next includes a circuit board in each pay phone, each circuit board includes a microcomputer and means to convert non-compatible signals directed to it to corresponding digital signals, the circuit board next includes a loop circuit branch comprising a pair of extension lines each with one end connected with a related telephone line and another end connected with one related end of the secondary winding of a transformer, the switches of a duplex relay switch are engaged in the extension lines between the telephone lines and the transformer, the microcomputer operates to direct operating voltage to the relay switch when a predetermined number of digital ring signals are received by it and to thereby close the loop circuit while the hook-switch remains open, the microcomputer receives and processes digital coin signals directed to it and holds in its memory digital data corresponding to: the dialing number of the pay phone; the number of coins of each denomination of coins held in the mechanism; the number of coins of each denomination of coins last delivered by the mechanism into the coin box; and, the total number of coins of each denomination of coins that have been accepted by the pay phone subsequent to setting the circuit board in operation, the microcomputer operates to send a carrier signal to the primary winding of the transformer and to impose thereon the data held in its memory in response to digital command signals corresponding to command signals conducted to it through the system on said operating voltage, the circuit board includes a command signal processor connected with the extension lines between the relay switch and transformer and that receives command signals carried by the operating voltage and directs corresponding digital command signals to the microcomputer; the system and apparatus next includes a monitoring station including a modem, digital computer and printer, the computer is connected with the switching board by means of and through the modem and is programmed to continuously sequentially dial the dialing numbers of and establish connection with each pay phone of the system and to cause the loop circuit of each pay phone with which is connects to be closed by the relay switch thereof, to thereafter direct command signals onto the operating voltage between the monitoring station and pay phone to cause the circuit board and microcomputer thereof to direct the carrier voltage to the transformer, impose the data stored thereby on the carrier voltage and to cause the transformer to impose the data carried by the carrier voltage onto the operating voltage, the computer is further programmed to: receive and process the digital data imposed upon the operating signal by the circuit board; cause the printer to print out a record including the dialing number of the pay phone; the number of coins of each denomination of coins last delivered by its mechanism to its coin box; the total number of coins of each denomination of coins accepted by it; and, to thereafter disconnect with the pay phone.

2. The pay phone system and apparatus set forth in claim 1 that further includes a sensing device connected with the microcomputer and positioned in the pay phone to sense a physical condition therein and to generate and transmit to the microcomputer an information signal when a change in that physical condition takes place, the information signal is processed by the microcomputer into digital data that is imposed upon its carrier voltage for transmission to and processing by the switching station.

3. The system and apparatus set forth in claim 1 wherein the primary operating voltage is in excess of 40 volts and part of the circuit board operate on a secondary working voltage of less than 10 volts, the circuit board includes a voltage regulator that receives the primary operating voltage from one of the telephone lines and directs the secondary working voltage to said parts of the circuit board, the carrier voltage delivered by the microcomputer to the transformer is equal to said working voltage and the transformer is a step-up transformer that steps up that voltage to the voltage of the primary operating voltage, the operating voltage delivered by the microcomputer to the relay switch is amplified by a voltage amplifier.

4. The system and apparatus set forth in claim 1 wherein the primary operating voltage is in excess of 40 volts and part of the circuit board operate on a secondary working voltage of less than 10 volts, the circuit board includes a voltage regulator that receives the primary operating voltage from one of the telephone lines and directs the secondary working voltage to said parts of the circuit board, the carrier voltage delivered by the microcomputer to the transformer is equal to said working voltage and the transformer is a step-up transformer that steps up that voltage to the voltage of the primary operating voltage.

5. The pay phone system and apparatus set forth in claim 1 that further includes a sensing device connected with the microcomputer and positioned in the pay phone to sense a physical condition therein and to generate and transmit to the microcomputer an information signal when a change in that physical condition takes place, the information signal is processed by the microcomputer into digital data that is imposed upon its carrier voltage for transmission to and processing by the switching station wherein the primary operating voltage is in excess of 40 volts and part of the circuit board operate on a secondary working voltage of less than 10 volts, the circuit board includes a voltage regulator that receives the primary operating voltage from one of the telephone lines and directs the secondary working voltage to said parts of the circuit board, the carrier voltage delivered by the microcomputer to the transformer is equal to said working voltage and the transformer is a step-up transformer that steps up that voltage to the voltage of the primary operating voltage, the operating voltage delivered by the microcomputer to the relay switch is amplified by a voltage amplifier.

6. The pay phone system and apparatus set forth in claim 1 that further includes a sensing device connected with the microcomputer and positioned in the pay phone to sense a physical condition therein and to generate and transmit to the microcomputer an information signal when a change in that physical condition takes place, the information signal is processed by the microcomputer into digital data that is imposed upon its carrier voltage for transmission to and processing by the switching station wherein the primary operating voltage is in excess of 40 volts and part of the circuit board operate on a secondary working voltage of less than 10 volts, the circuit board includes a voltage regulator that receives the primary operating voltage from one of the telephone lines and directs the secondary working voltage to said parts of the circuit board, the carrier voltage delivered by the microcomputer to the transformer is equal to said working voltage and the transformer is a step-up transformer that steps up that voltage to the voltage of the primary operating voltage.

7. The system and apparatus set forth in claim 1 that further includes a portable manually operable microcomputer base programmer with a multi-pin connector part releaseably engagable with a mating multi-pin connector part connected with the microcomputer of the circuit board of each pay phone, the programmer includes an LCD read-out, a ten-key numerical key pad and dedicated command keys, the programmer is selectively manually releaseably connected with the microcomputers of each pay phone in the system and is selectively manually operated to enter the dialing number of the pay phones in the memory of their related microcomputers and to read and display the data in the memory of the microcomputers on its LCD display.

8. The system and apparatus set forth in claim 1 that further includes a portable manually operable microcomputer base programmer with a multi-pin connector part releaseably engagable with a mating multi-pin connector part connected with the microcomputer of the circuit board of each pay phone, the programmer includes an LCD read-out, a ten-key numerical key pad and dedicated command keys, the programmer is selectively manually releaseably connected with the microcomputers of each pay phone in the system and is selectively manually operated to enter the dialing number of the pay phones in the memory of their related microcomputers and to read and display the data in the memory of the microcomputers on its LCD display, said programmer includes a manually operated printer-calculator that is manually operated to transcribe and print out a permanent record of the data displayed on the LCD display of each pay phone when the programmer is connected therewith and the data stored therein is displayed thereby.

9. In a coin-operated pay phone that is connected with a related central switching device on a related central switching board by a pair of telephone lines and wherein a normally open loop circuit through the pay phone, switching device and telephone lines is closed to put the pay phone in operation and enable it to be connected with another telephone by a normally open hook-switch in the pay phone that closes when a user of the pay phone manipulates a part thereof that operates to close the hook-switch; the pay phone next includes a coin counting device connected with parts in the pay phone and that includes a microcomputer that receives and stores in its memory data pertaining to the coinage deposited in and handled by the pay phone and that operates to impose the data stored thereby on the operating voltage on the telephone lines in response to command signals directed to it by a monitoring computer connected with the switching board while the hook-switch remains open, the monitoring computer operates to connect with the pay phone by first causing the switching device thereof to direct intermittent ring signals to the pay phone, the coin counting device includes a pair of extension lines each connected with one of the telephone lines and a normally open relay switch engaged with and between the extension lines, the counting device has a coupler that receives the intermittent ring signals and that directs corresponding digital ring signals to the microcomputer, the microcomputer is programmed to direct an operating voltage to the relay switch and cause closing of the switch and loop circuit and connection between the pay phone and monitoring computer when a predetermined number of digital ring signals have been directed to it.

* * * * *